June 23, 1925.

C. H. DUNLOP 1,543,067

EDUCATIONAL APPLIANCE

Filed Dec. 10, 1923

WITNESSES

INVENTOR
C. H. Dunlop,

BY

ATTORNEYS

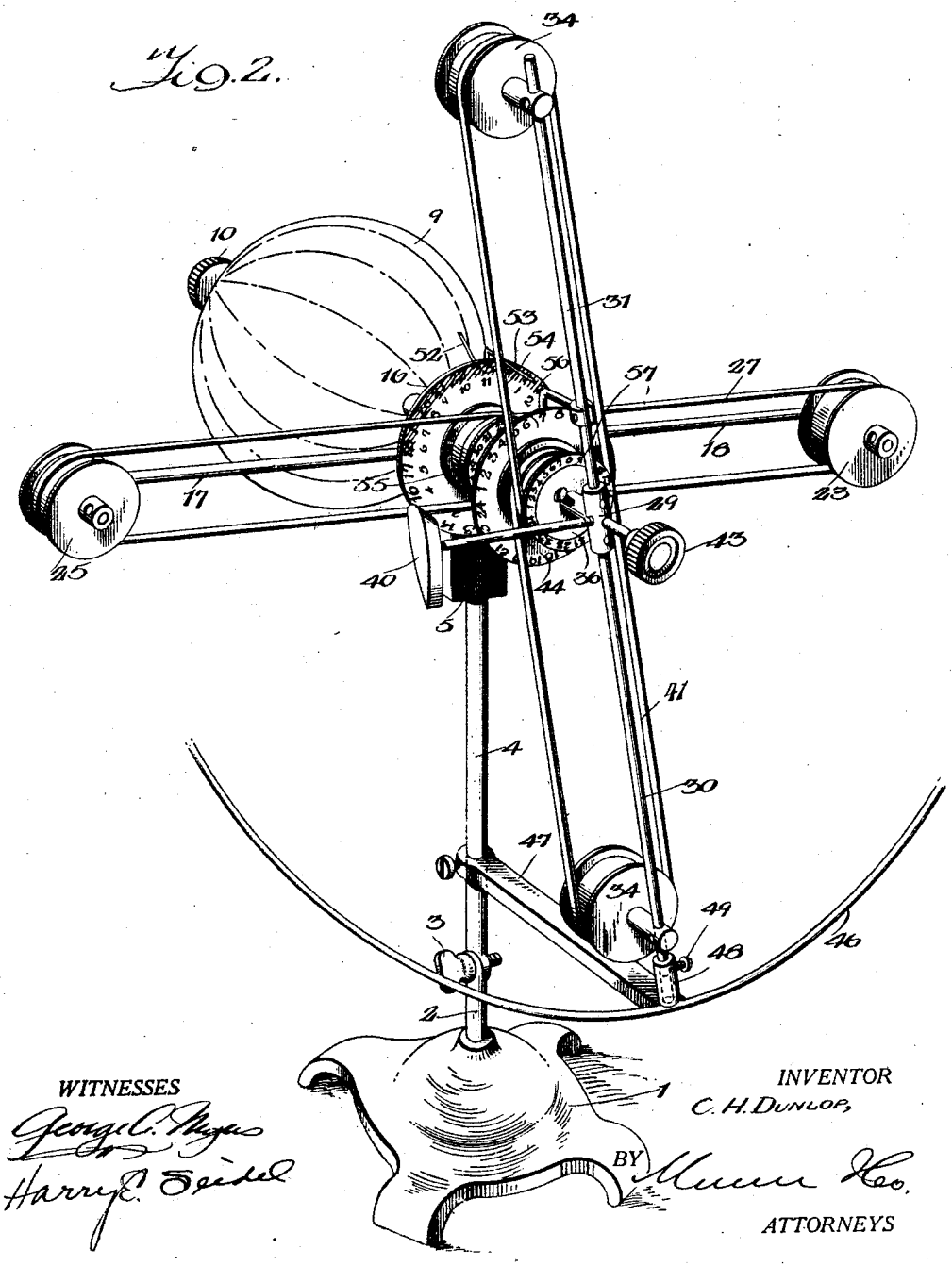

June 23, 1925.
C. H. DUNLOP
EDUCATIONAL APPLIANCE
Filed Dec. 10, 1923     3 Sheets-Sheet 3
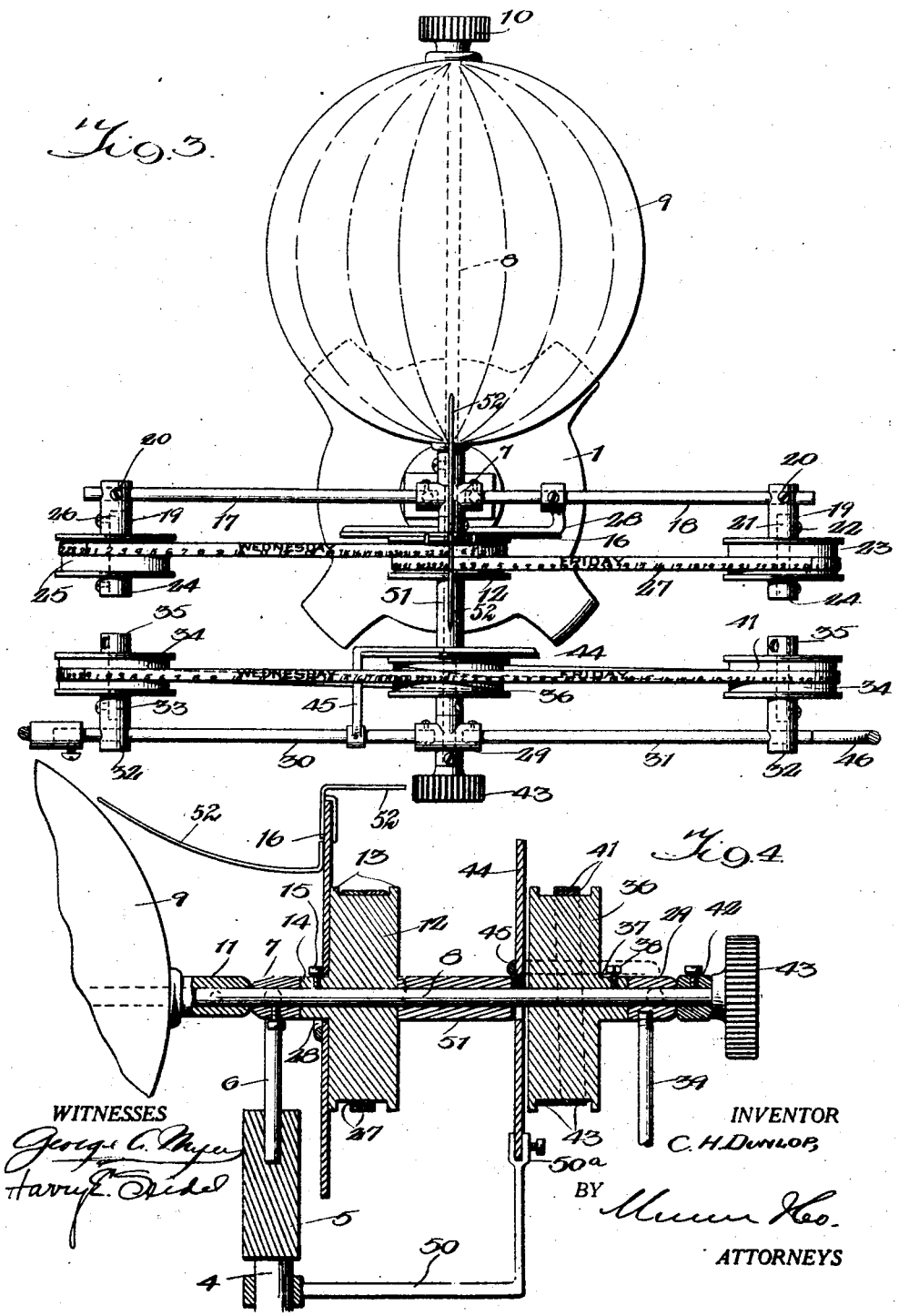

Patented June 23, 1925.

1,543,067

UNITED STATES PATENT OFFICE.

CHARLES H. DUNLOP, OF BROOKLYN, NEW YORK.

EDUCATIONAL APPLIANCE.

Application filed December 10, 1923. Serial No. 679,714.

*To all whom it may concern:*

Be it known that I, CHARLES H. DUNLOP, a citizen of the United States, and a resident of Brooklyn, in the county of Kings and State of New York, have invented certain new and useful Improvements in Educational Appliances, of which the following is a specification.

This invention relates to an educational appliance and is more particularly directed to a device for teaching the principle of time with relation to the revolution of the earth on its axis.

An object of the invention is the provision of a device adapted for the purpose of teaching in a more concrete manner the principles of the variations in time between the several parts of the earth and with respect to the meridians located upon a terrestrial globe.

A further object of the invention is the provision of a device for clearly demonstrating the principles involved for determining the time of the various places on the earth with respect to the international date line and Greenwich together with a variable means for determining the time of a particular place in any position and during the revolution of the earth on its axis.

A still further object of the invention is the provision of a device for illustrating the revolution of the earth during a period of twenty-four hours and similarly the revolution of the earth and the various position of certain places on the earth during multiples of the twenty-four hour period or day.

As a further object the invention provides a device for concretely illustrating the apparent gain of time when a boat is traveling from east to west and the necessity for subtracting a day from the calendar when a ship crosses the international date line and likewise illustrating the loss in time when a boat travels from west to east and the necessity of adding a day to the calendar when the boat crosses the international date line from west to east.

This invention will be best understood from a consideration of the following detailed decription, in view of the accompanying drawing forming a part of the specification; nevertheless it is to be understood that the invention is not confined to the disclosure, being susceptible of such changes and modifications as shall define no material departure from the salient features of the invention as expressed in the appended claims.

In the drawings:

Fig. 2 is a view in perspective of the same.

Fig. 3 is a plan view thereof.

Fig. 4 is a fragmentary vertical sectional view of the same.

Figure 1:
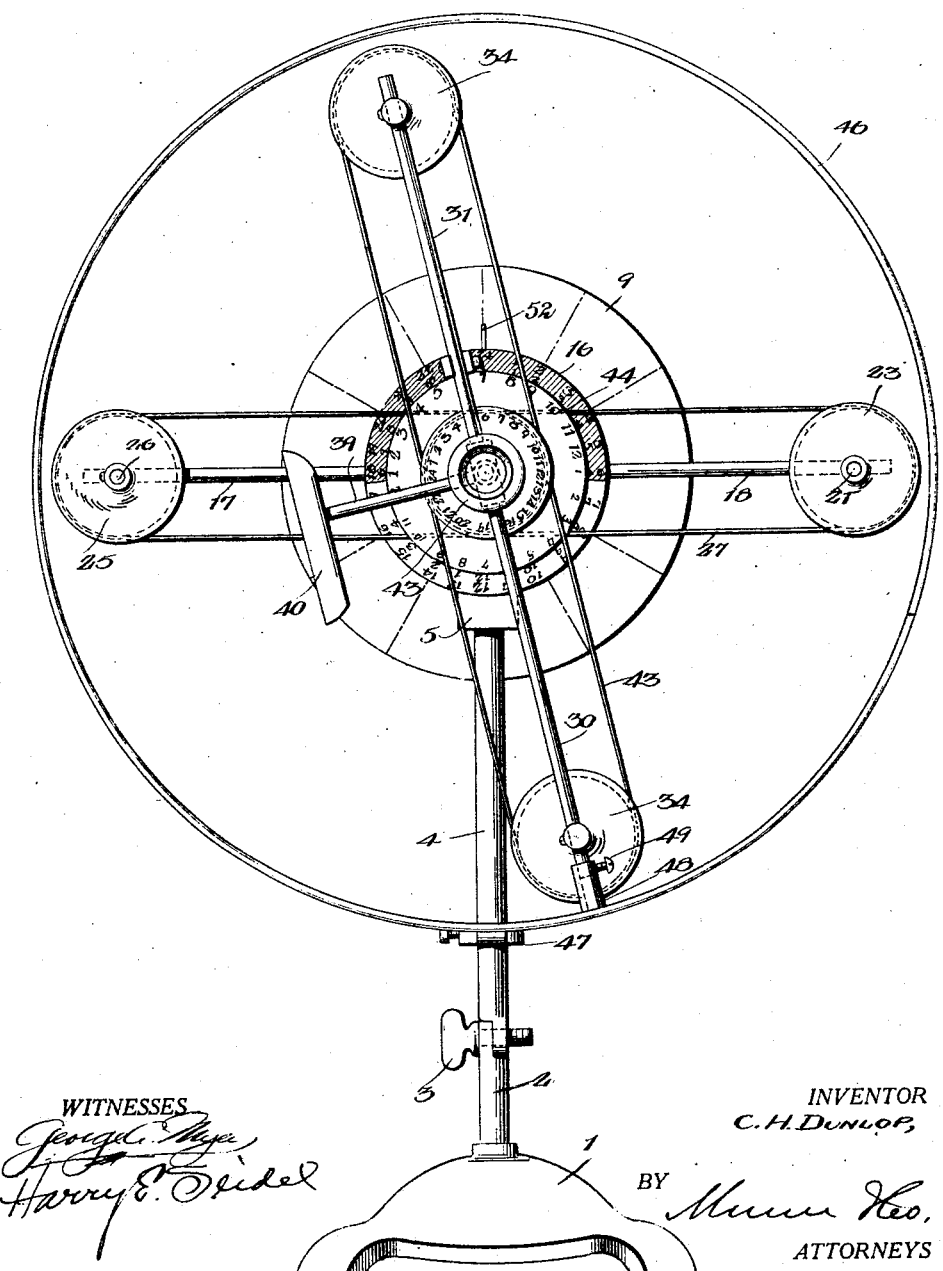
Figure 1 is a view in elevation of an an educational device embodying the invention.

Referring more particularly to the drawings, 1 designates a base member having a short standard 2 upon which is pivotally mounted, by means of a wing nut 3, a vertical rod 4. The upper free end of the rod is provided with a block 5 having a pair of vertical sockets adapted to receive a pair of prongs 6 rigidly connected with a sleeve 7 and depending from said sleeve.

The sleeve is provided with a transverse passage in which is mounted a shaft 8. To the outer ends of the shaft is rigidly connected a terrestrial globe 9 with the shaft 8 in longitudinal alinement with the polar axis of the globe. The shaft extends through the globe and projects beyond the same and is connected to a knurled knob 10. A sleeve 11 connected with the shaft spaces the north pole of the globe from the sleeve 7.

A drum 12 provided with spaced peripheral flanges 13 to form a groove has an axially projecting sleeve 14. The sleeve and drum have an axial passage which receives the shaft 8. A set screw 15 carried by sleeve 14 locks the drum 12 to said shaft.

The disc 16 is carried by the rod 18 and is centrally apertured to receive the sleeve 14 therethrough. The disc 16 is provided with a dial face upon which are concentrically located two series of numbers, the purpose of which will be presently explained.

A rod 17 is screwed into one end of the sleeve 7 while a rod 18 is screwed into the opposite end of said sleeve, with the rods being in longitudinal alinement and parallel to a tangent at the north pole of the globe 9. A sleeve 19 provided with a transverse perforation receive the outer end of the rod 18, while a set screw 20 functions to rigidly lock the sleeve 19 radially with respect to the rod 18, thus permitting of the moving of the sleeve to a position for effecting a separation of the leads of the tape on the drum 12.

An axle 21 is inserted within the free end of the sleeve and is locked in place by set screw 22. A flanged drum 23 is loosely mounted on the axle for rotation and is held in place by a collar 24 secured to the outer end of the axle by means of the set screw. A flanged drum 25 is mounted on an axle 26 which is held in position on the outer free end of the rod 17 in a manner similar to the construction of the mounting of the axle 21.

An endless tape 27 is trained around the drums 23 and 25 and has an intermediate portion coiled about the drum 12. The tape is divided into seven sections with each section representing a day in the week and colored to represent the seven prismatic colors. Each section is provided with indicia designating a day in the week and as shown more particularly in Figure 3, the portion of the tape which appears at the right of the figure, is designated as Friday and that portion of the tape representing Friday is further divided into twenty-four sections representing each hour of the day. The top of the tape appearing at the left is designated as Wednesday, and it will be noted that the end of the section which represents the beginning of the day of Friday is in line with one end of the section represented by Wednesday, the intervening day Thursday being coiled about the drum 12. The length of the portion of the tape coiled about the drum, which represents a day or twenty-four hours is equal to the circumference of the periphery of the drum 12 over which the tape operates so that at each revolution of the drum or of the terrestrial globe 9, a portion of the tape representing twenty-four hours, will pass over the drum.

An arm 28, which is adjustably secured to the rod 18, is disposed parallel to said rod and secured to the back of the disc 16. Upon the outer face of drum 12 is provided a dial having numerals from 1 to 24 located against the periphery of said face for a purpose which will be presently explained.

A sleeve 29 is adapted to be secured to the outer end of the shaft 8 and is provided with oppositely projecting rods 30 and 31. Upon the ends of the rods are mounted sleeves 32 located at right angles to the rod and in a horizontal plane. An axle 33 is mounted in the inner end of each sleeve and rigidly held in place by means of a set screw upon which are rotatably mounted drums 34. A collar 35 locked to the axle 33 by a set screw maintains the drums on the respective axles.

A flanged drum 36 is axially mounted on the shaft 8 and rigidly secured to said shaft by means of a laterally projecting sleeve 37 in which is a set screw 38. Upon the outer end of a rod 39 is mounted an object 40 which is preferably in the shape of a boat. The rod is inserted in an opening in the sleeve 29. An endless tape 41 is trained around pulleys 34 and has a portion coiled about the pulley 36. The tape 41 is likewise divided into seven sections designated as a day of the week and each section is subdivided longitudinally into twenty-four subdivisions representing the hours of the day. The length of each section is equal to the circumference of the pulley 36 over which the tape operates so that when the pulley is revolved one complete revolution, a complete section of the tape will pass in plan view to the observer.

A collar 42 to which is connected the knurled knob 43 is rigidly secured to the shaft 8 by means of a set screw so that by rotating said knob the shaft will be revolved. A disc 44 is rigidly connected with rod 30 through an arm 45 which extends parallel to rod 30 and secured to the back of said disc in any approved manner. The front face, adjacent the periphery of the disc 44 is provided with numerals from 1 to 24 inclusive which designate the various hours of the days of a particular place where the educational appliance is employed or for designating the various times at any interval during the day of any other place that may be selected.

The front face adjacent its periphery of the drum 36 is likewise provided with a series of numerals from 1 to 24 and for a purpose which will be presently explained.

A ring 46 rigidly connected to a bracket arm 47 is located adjacent the path of revolution of the ends of the rods 30 and 31. The bracket arm 47 is rigidly secured to the post 4 and is carried thereby so that as the post 4 is rocked the ring 46 will likewise be rocked therewith. Upon the outer end of either rod 30 or 31 is slidably mounted a sleeve 48 adapted to be locked in position by means of a set screw 49. The mechanism including the revolving rods 30, 31, drum 36 and disc 44 is adapted to be locked in any one of a plurality of positions by moving the outer end of the sleeve 48 in frictional engagement with the ring 46 and maintaining it in position by the set screw 49.

In place of the ring 46, if desirable, an arm 50 may be secured to the post 4 and be bent upwardly sufficiently for a clamp 50ª to grip the periphery of the disc 44 and lock the disc at a predetermined position in its revolution.

If desired, a sleeve 51 may be slipped upon the shaft 8 between drum 12 and disc 44 to aid in maintaining the drum in spaced relation with said disc.

As shown more particularly in Figure 2, a pointer 52 is secured to the top of the dial or disc 16 and at the numeral 24 and extends rearwardly parallel to the shaft 8 and likewise to the polar axis of the terrestrial globe 9. The pointer is adapted to locate more definitely the meridians of said globe.

A portion of the face of the dial 16 embracing certain of the numerals between 18 and 6 and passing through the numeral 24 is shaded to represent night while the remaining portion of the dial is white to represent day. It will be noted that a series of numerals are located concentric with the large numerals 1 to 24 inclusive and adapted to designate the hours according to the practice generally employed, that is the civil day, in other words from 1 to 12 inclusive for a. m. and 1 to 12 inclusive p. m., while the larger numerals from 1 to 24 designate the hours of the solar time. The civil time dial with numerals reading from 1 to 12, or the solar time dial with numerals reading from 1 to 24, may be used as desired.

The dial 16, the dial 44 and the front faces of the drums 12 and 36 are divided into 24 sectors, each representing 15° or the distance between adjacent meridians on the terrestrial globe 9 so that every 15° represents a difference in time or 1 hour on the globe and it may be seen that it is easy to determine the local times of various places on the earth by rotating the shaft 8 and locating the meridian passing through some well-known place at the time of the day at which the observation is being made.

In use and operation of the device, the first problem to be demonstrated is to find the difference in time between a selected point and the international date line, at which point all civil time is reckoned in contradistinction to solar or nautical Greenwich time. For instance let the base 1 represent the sun, set the pointer 52 on the 180th meridian by revolving the shaft 8. Set the dial and drum 12 by means of the set screw 15 so that the numbers thereon correspond to the numbers on the dial 16. Then adjust the left end of Friday on the tape 27 on a tangent of the drum 12, the face of which represents a Mercator projection which corresponds to the globe 9. This setting shows the beginning of the civil day Friday, and the numbered hours about to be exhibited. As the shaft 8 is turned to the left, the globe 9 turns therewith it is assumed in an eastward direction and the pointer 52 constantly points to midnight as the pointer relatively and apparently progresses westward. The age of the day Friday at the 180th meridian or the international date line is denoted both by the progression of numbers on the dial of the drum 12 and the numbers on the tape 27 as read at the top of said drum 12, both sets of numbers being used for a similar purpose. For instance when the 75° west (upon which line New York city is approximately located) arrives at the pointer 52, seventeen o'clock will appear both on the tape 27 and on the dial of drum 12 at the top of said drum. This time is the standard time of the civil day with which the local time hereafter described will be compared.

The second problem and operation of the device for comparing the local time with the standard civil day is accomplished in the following manner. The parts are left in the position as set forth in the first problem where seventeen o'clock 75° west (New York city) were denoted in the preceding operation. The second unit consisting of the drum 36 and its relative parts located parallel to the first unit are then brought into play. The dial of the drum 36 is then adjusted by the set screw 38 so as to correspond with the numbers on the dials 44 and 16. The left end of the section Friday of the tape 43 is then adjusted on a tangent of the drum 36. Here it will be noted that the dial of the drum 36 with the section Friday of its tape 43 is seventeen hours in arrears of the first unit. This is the beginning of Friday local time at 75° west (New York city). The second and first units are then rotated in unison eastward (to the left) by means of the shaft 8 and the discrepancy of the sections and numbers on the tapes 27 and 43 and the dials 12 and 36 at their tangents are read. For comparing other local times the first unit may be taken as a standard or it is to be understood that the units may be multiplied for the comparison of various local times at various points. It should be noted that the second unit may be operated at any angle to the first or vice versa for simple or involved operations according to the degree of advancement of the student.

The third example for illustrating the apparent loss or gain of a day in circumnavigation of the globe is accomplished in the following manner. The globe 9 is revolved until the pointer 52 coincides with the 180th meridian; the dial is adjusted on drum 12 by means of set screws 15 until it corresponds with the dial 16, then adjust the left end of the section Friday of tape 27 is adjusted to its tangent of the drum 12 and adjust the tape and dials of the second unit by the set screw 38 to correspond to the first unit. This represents the beginning of Friday for both units. The shaft 8 is then held against rotation by either of the knobs 10 or 43 and then the entire second unit is rotated, arms 30 and 31 being rotated on the axle 8 by virtue of the free sleeve 29, in a direction from left to right for one complete revolution. It will be noted at the same time that the boat or object 40 on the rod 39 is moved westward. The rotation of the unit about its stationary drum 36 winds on said drum 36, the on-coming section Friday of the tape 41 so that when the west bound rod arrives at the 180° the section Friday on the tape 27 appears, but the section Saturday on the tape 43 shows the apparent gain of a day. To turn the boat 40 eastward, by revolving the arms 30 and 31 would wind the day off the stationary drum and apparently effect the loss of a day. By revolving the globe 9 three-hundred-sixty-five times eastward during either of the above operations the results are the same.

By adjusting the nut 3 the vertical rod 4 may be oscillated to a position so that when required the globe may be placed in a more convenient position for illustrating the rotation of the earth.

What I claim is:

1. In an apparatus of the class described, the combination of a support, a shaft mounted for rotation on the support, a terrestrial globe rigidly connected with the shaft and having its polar axis in longitudinal alinement with the shaft, a disk mounted against rotation with the shaft passing through the axis of the disk, said disk having a dial plate provided with a series of numerals representing the hours of the day, a bracket arm projecting laterally from the support and provided with axles at its opposite ends, flanged drums rigidly mounted for rotation on the axles, a flanged drum rigidly connected with the shaft and mounted for rotation therewith located adjacent the dial plate, an endless band supported by the first mentioned drum and having a portion coiled about the drum on the shaft, said tape having its outer face divided into sections representing the days of the week, with each section equal in length to the circumference of the drum on the shaft whereby a complete rotation of the drum will cause to be advanced one section of the band.

2. In a device of the class described, the combination with a shaft, a terrestrial globe rigidly connected with the shaft, said shaft being in alinement with the polar axis of the globe, a dial face provided with indicia designating the hours of the day, a drum mounted on the shaft adjacent the dial and adapted to be rotated by said shaft, a pair of drums spaced from the first mentioned drums, a bracket supporting the loosely mounted drums in spaced relation with the drum on the shaft, an endless band engaging around the loosely mounted drums and having a portion entrained around the drum on the shaft whereby rotation of the shaft will cause longitudinal movement in opposite directions of the tape, said tape being divided into a plurality of sections, each section representing a day of the week whereby complete rotation of the drum and globe representing twenty-four hours of time will cause one complete section of the tape to be moved along through a space for disclosing the passing of the complete day, each section of the tape being equal to the periphery of the drum on the shaft.

3. In an apparatus of the class described, the combination of a shaft, a terrestrial globe connected with the shaft and having its polar axis in alinement with the longitudinal axis of the shaft, a sleeve mounted transversely of the shaft and provided with oppositely projecting arms, means for locking the sleeve to the shaft, axles rigidly secured at opposite ends of the rod, drums loosely mounted for rotation on the axles, a drum adapted to be locked to the shaft, a tape engaging the loosely mounted drums and having a portion wound about the drum on the shaft, a dial plate having indicia designating the hours of the day, said sleeve adapted to be released from its rigid connection with a shaft and rotated about the shaft independently of the rotation of the shaft.

4. In an apparatus of the class described, the combination of a shaft, a terrestrial globe connected with the shaft and having its polar axis in alinement with the longitudinal axis of the shaft, a sleeve mounted transversely of the shaft and provided with oppositely projecting arms, means for locking the sleeve to the shaft, axles rigidly secured at opposite ends of the rod, drums loosely mounted for rotation on the axles, a drum adapted to be locked to the shaft, a tape engaging the loosely mounted drums and having a portion wound about the drum on the shaft, a dial plate having indicia designating the hours of the day, said sleeve adapted to be released from its rigid connection with a shaft and rotated about the shaft independently of the rotation of the shaft, the tape being divided into sections and colored to conform to the prismatic colors to represent the days of the week, each section of the tape being equal in length to a circumference of the drum mounted on the shaft, the dial plate adapted to be rigidly connected with one of the oppositely projecting arms to permit simultaneous rotation of the arms and the dial plate.

5. In an apparatus of the class described, the combination of a shaft, a terrestrial globe connected with the shaft and having its polar axis in alinement with the longitudinal axis of the shaft, a sleeve mounted transversely of the shaft and provided with oppositely projecting arms, means for locking the sleeve to the shaft, axles rigidly secured at opposite ends of the rod, drums loosely mounted for rotation on the axles, a drum adapted to be locked to the shaft, a tape engaging the loosely mounted drums and having a portion wound about the drum on the shaft, a dial plate having indicia designating the hours of the day, said sleeve adapted to be released from its rigid connection with the shaft and rotated about the shaft independently of the rotation of the shaft, and means independent of the locking means for the sleeve for locking the arms in a plurality of different angular positions during rotation of said arms.

6. In an apparatus of the class described, the combination of a support, a shaft mounted for rotation on the support, a terrestrial globe rigidly connected with the shaft and having its polar axis in longitudinal alinement with the shaft, a disc mounted against rotation with the shaft passing through the axis of the disc, said disc having a dial face provided with a series of numerals representing the hours of the day, a bracket arm projecting laterally from the support and provided with axles at its opposite ends, flanged drums rigidly mounted for rotation on the axles, a flanged drum rigidly connected with the shaft and mounted for rotation therewith located adjacent the dial face, an endless band supported by the first mentioned drum and having a portion coiled about the drum on the shaft, said tape having its outer face divided into sections representing the days of the week, with each section equal in length to the circumference of the drum on the shaft whereby a complete rotation of the drum will cause to be advanced one section of the band, a pointer mounted on the disc and projecting rearwardly terminating adjacent the surface of the terrestrial globe.

7. In an apparatus of the class described, the combination of a support, an axle mounted for rotation on the support, bracket arms, means connecting the inner ends of the bracket arms and supporting the same upon a shaft, drums loosely mounted for rotation upon the opposite ends of the rods and at right angles to the longitudinal axis of said rods, a drum rigidly connected with the shaft, an endless band engaging around the loosely mounted drums and having a portion coiled about the drum on the shaft, the band being divided into sections with each section being equal to the length of the circumference of the drum on the shaft, a dial plate connected with one of the bracket arms and located adjacent the drum on the shaft and provided with indicia designating the hours of the day, a second pair of bracket arms connected together and supported upon the shaft, a second pair of loosely mounted drums supported for rotation at the opposite ends of the bracket arm, a second drum rigidly secured to the shaft and spaced from the first mentioned drum on the shaft, a second dial plate located adjacent the second mentioned drum on the shaft and provided with indicia designating the hours of the day, a second endless band engaging around the last mentioned loosely mounted drums and having a portion coiled about the second mentioned drum on the shaft, the second mentioned drum on the shaft being adapted to be rotated independently of the shaft and locked to the shaft for simultaneous rotation.

8. In an apparatus of the class described, the combination of a support, a shaft rotatably carried by said support, a terrestrial globe connected with the shaft and having its polar axis in longitudinal alinement with the shaft, a stationary disc angularly divided with each division numbered and representing an hour of the day, an endless band, being divided into sections with each section representing a day of the week, pulleys spaced from the shaft and supporting said band, a drum mounted on a shaft around which a portion of the band is coiled whereby rotation of the shaft and drum will cause displaying consecutively the sections of the tape at each revolution of the drum and a complete revolution of the drum indicating a revolution of the earth on its polar axis through a period of twenty-four hours.

9. In an apparatus of the class described, the combination of a support, a shaft rotatably carried by said support, a terrestrial globe connected to the shaft, an endless band supported by a movement from the shaft, means connecting the endless band with the shaft whereby rotation of the shaft will cause travelling of the endless band, said endless band being divided into sections representing the days of the week whereby when the shaft and terrestrial globe is revolved the tape will be caused to travel in a manner for displaying the days of the week for each revolution of the terrestrial globe.

10. In an apparatus of the class described, the combination of a support, a shaft rotatably carried by said support, a terrestrial globe connected to the shaft, an endless band supported by a movement from the shaft, means connecting the endless band with the shaft whereby rotation of the shaft will cause travelling of the endless band, said endless band being divided into sections representing the days of the week whereby when the shaft and terrestrial globe is revolved the tape will be caused to travel in a manner for displaying the days of the week for each revolution of the terrestrial globe, and discs carried by the shaft and adapted to disclose the hours of a day as each day is paid out upon the endless belt.

CHARLES H. DUNLOP.